United States Patent
Kwark et al.

(10) Patent No.: US 10,520,265 B2
(45) Date of Patent: Dec. 31, 2019

(54) METHOD FOR APPLYING A SLURRY COATING ONTO A SURFACE OF AN INNER DIAMETER OF A CONDUIT

(71) Applicants: Sang Muk Kwark, Williamsville, NY (US); Zigui Lu, East Amherst, NY (US); David P. Potempa, Boston, NY (US); Maulik R. Shelat, Williamsville, NY (US)

(72) Inventors: Sang Muk Kwark, Williamsville, NY (US); Zigui Lu, East Amherst, NY (US); David P. Potempa, Boston, NY (US); Maulik R. Shelat, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 126 days.

(21) Appl. No.: 14/884,171

(22) Filed: Oct. 15, 2015

(65) Prior Publication Data
US 2017/0108296 A1    Apr. 20, 2017

(51) Int. Cl.
*B05D 3/06* (2006.01)
*B05D 1/40* (2006.01)
(Continued)

(52) U.S. Cl.
CPC .............. *F28F 13/185* (2013.01); *B05C 7/02* (2013.01); *B05D 1/02* (2013.01); *B05D 1/40* (2013.01);
(Continued)

(58) Field of Classification Search
CPC . B05D 1/02; B05D 1/40; B05D 3/065; B05D 3/066; B05D 7/22; B05D 7/222;
(Continued)

(56) References Cited

U.S. PATENT DOCUMENTS 3,130,077 A * 4/1964 Burden ............... B22D 13/102
                                                 118/306
3,248,251 A   4/1966 Allen
(Continued)

FOREIGN PATENT DOCUMENTS

CN         102653003 A    9/2012
GB          1350697 A *   4/1974   ......... B05B 13/0654
(Continued)

OTHER PUBLICATIONS

Definition of "pumping" retrieved from https://www.thefreedictionary.com/pumping on Jun. 5, 2018, 3 pages. (Year: 2018).*
(Continued)

*Primary Examiner* — William P Fletcher, III
(74) *Attorney, Agent, or Firm* — Nilay S. Dalal

(57) ABSTRACT

A method for creating a coating onto an inner diameter of conduit, whereby an injection nozzle is moved in a forward direction until its tip is aligned with the end of the conduit. Slurry is pumped from a reservoir into the injection nozzle and then is discharged through the tip of the injection nozzle. The slurry flows, distributes and spreads onto the surface of the conduit. The conduit is rotated and the nozzle is retracted as slurry continues to discharge from the nozzle to coat the remainder of the conduit.

17 Claims, 10 Drawing Sheets

(51) Int. Cl.
  B05D 1/02    (2006.01)
  B05D 7/22    (2006.01)
  B05D 1/00    (2006.01)
  F28F 13/18   (2006.01)
  F28F 1/10    (2006.01)
  B05C 7/02    (2006.01)
  C09K 5/14    (2006.01)
  B22F 5/00    (2006.01)

(52) U.S. Cl.
  CPC ............ B05D 3/065 (2013.01); B05D 3/066 (2013.01); B05D 7/22 (2013.01); B05D 7/222 (2013.01); B22F 5/00 (2013.01); C09K 5/14 (2013.01); F28F 1/10 (2013.01); F28F 13/187 (2013.01); *B05D 1/002* (2013.01); *B05D 2254/04* (2013.01); *B05D 2401/10* (2013.01); *B05D 2401/20* (2013.01); *B05D 2401/21* (2013.01); *B05D 2401/40* (2013.01)

(58) Field of Classification Search
  CPC ............ B05D 2254/04; B05D 2401/10; B05D 2401/20; B05D 2401/21; B05D 2401/40; B05C 7/02; B05B 15/10; F28F 1/00; F28F 1/10; F28F 13/185; F28F 13/187
  USPC ...... 427/233, 236, 372.2, 425, 472.2, 472.3, 427/231; 118/688, 300, 318, 321, 323; 165/133, 177
  See application file for complete search history.

(56) References Cited

U.S. PATENT DOCUMENTS

| | | | |
|---|---|---|---|
| 3,384,154 A | | 5/1968 | Milton |
| 3,523,577 A | | 8/1970 | Milton |
| 3,587,730 A | | 6/1971 | Milton |
| 3,607,369 A | | 9/1971 | Batta |
| 3,753,757 A | | 8/1973 | Rodgers et al. |
| 3,837,899 A | * | 9/1974 | Carlberg ............... B05D 7/222 138/143 |
| 4,064,914 A | | 12/1977 | Grant |
| 4,074,753 A | | 2/1978 | Schmittle et al. |
| 4,182,412 A | | 1/1980 | Shum |
| 4,232,056 A | | 11/1980 | Grant et al. |
| 4,262,627 A | * | 4/1981 | Roeder ............... B05B 13/0654 118/318 |
| 4,291,758 A | | 9/1981 | Fujii et al. |
| 4,358,485 A | | 11/1982 | Kern et al. |
| 4,359,086 A | | 11/1982 | Sanborn et al. |
| 4,653,572 A | | 3/1987 | Bennett et al. |
| 4,663,243 A | | 5/1987 | Czikk et al. |
| 4,699,209 A | | 10/1987 | Thorogood |
| 4,917,960 A | | 4/1990 | Hornberger et al. |
| 5,260,243 A | * | 11/1993 | Dunne ................ B01J 20/08 502/63 |
| 5,503,222 A | * | 4/1996 | Dunne ................ B01J 20/183 165/10 |
| 5,814,392 A | | 9/1998 | You et al. |
| 6,119,770 A | | 9/2000 | Jaber |
| 6,916,502 B2 | * | 7/2005 | Moore ............... B05B 15/0412 427/105 |
| 7,677,300 B2 | | 3/2010 | O'Neill et al. |
| 2005/0285537 A1 | * | 12/2005 | Inagaki ................ H01J 61/35 313/635 |
| 2007/0202321 A1 | | 8/2007 | You et al. |
| 2017/0108148 A1 | | 4/2017 | Lu et al. |
| 2017/0108296 A1 | | 4/2017 | Kwark et al. |

FOREIGN PATENT DOCUMENTS

| | | |
|---|---|---|
| GB | 1350697 A | 4/1974 |
| MX | 2016001850 A | 4/2017 |
| MX | 2016001852 A | 4/2017 |

OTHER PUBLICATIONS

Definition of "" retrieved from https://www.thefreedictionary.com/pumping on Jun. 5, 2018, 3 pages. (Year: 2018).*

"Nucleate Boiling", Wikipedia, https//en.wikipedia.org/wiki/Nucleate_boiling. Sep. 2, 2015, pp. 1-5.

Jung et al., "Observations of the Critical Heat Flux Process During Pool Boiling of FC-72", Journal of Heat Transfer, vol. 136, (Apr. 2014) 041501. Downloaded from: http://heattransfer.asmedigitalcollection.asme.org/.

Kutateladze, S.S. "Boiling Heat Transfer" Unedited Rough Draft Translation 270076, FTD-IT-62-52/1+2+4. Paper for presentation at Heat Transfer Conference, Jun. 5-10, 1961, at Minsk, USSR, pp. 1-39.

Priarone, A "Effect of surface orientation on nucleate boiling and critical heat flux of dielectric fluids", International Journal of Thermal Sciences, 44, (2005), pp. 822-831.

* cited by examiner

Coating Process Map

- Air flow first at 10-50 SCFH per tube, preferably 10-20 SCFH per tube (standard cubic foot per hour) for 10-30 mins
- Direction of air flow does not matter
- Keep air flow and turn on convective heating (e.g., 30-60 mins)

Illustration of the coating process

Comparison of the thickness variation between spray and rolling methods

Comparison of the boiling performance between spray and rolling methods

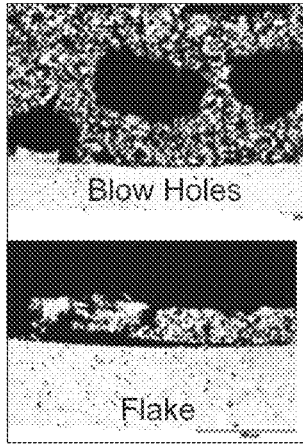
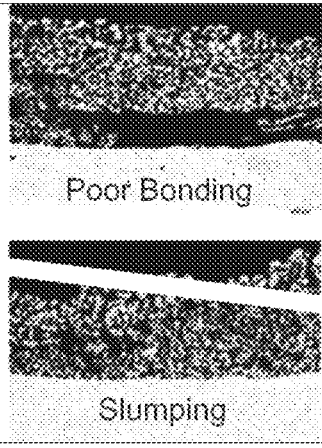
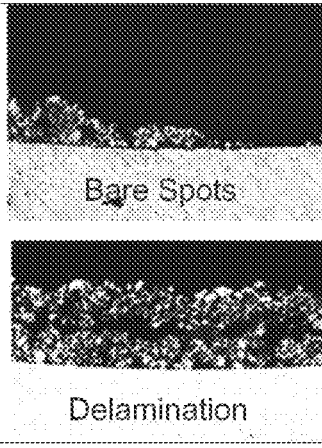
FIG. 6a  FIG. 6b  FIG. 6c
FIG. 6d  FIG. 6e  FIG. 6f
Convential Coating Defects
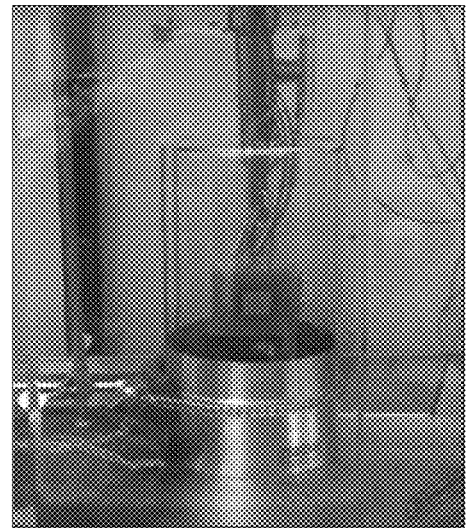
FIG. 7
Pool Boiling Rig with Test Specimen Loaded Inside Dewar Test Flow Diagram of the Program

- Air flow first at 10-50 SCFH per tube, preferably 10-20 SCFH per tube (standard cubic foot per hour) for 10-30 mins
- Direction of air flow does not matter
- Keep air flow and turn on convective heating (e.g., 30-60 mins)

Illustration of the coating process
(rolling starts from the beginning of the coating process)

(Crank & gear for rolling a batch of tubes)

- Rolling continues (after slurry application)
- Drying table (air and heating) while tubes continue to roll; Air flow and heating process can be applied in the separate tables Mass Manufacturing process (batch process-multiple tubes)

Batch 1

Slurry drying batch for tubes that slurry was already applied (black layer). Supplying air flow and heating (can be together or separately)

Batch 2

Slurry application batch

Batch 3

Non-coated batch (bare tube)

| Type | Flat square sample | Circular sample |
|---|---|---|
| Shape | | |
| Dimension | 1"x1"x1/2" | 1"x1" base<br><br>~0.9" OD & 0.08" Wall |
| Resistor | 1"x1" | |
| Fully assembled Test sample specimen | | |

FIG. 12

METHOD FOR APPLYING A SLURRY COATING ONTO A SURFACE OF AN INNER DIAMETER OF A CONDUIT

FIELD OF THE INVENTION

This invention relates to novel methods for applying slurries along one or more surfaces to produce metallic porous coatings having enhanced heat transfer. More particularly, the methods result in the creation of porous coating compositions with greater reproducibility and control of coating thickness.

BACKGROUND OF THE INVENTION

Heat exchangers are utilized in a variety of industrial processes to transfer heat between two or more fluids by indirect heat exchange. There are different designs for heat exchangers. For instance, one heat exchanger design is commonly referred to as a shell and tube design in which one fluid flows through the tubes and another fluid flows outside the tubes but inside a shell housing that retains the tubes. The fluid can be a liquid, vapor or a combination thereof. Further, the shell can be formed by or integrated with other equipment in which the heat transfer is to be conducted, for instance, a distillation column.

In another type of design, known as a plate-fin heat exchanger, a series of plates, referred to commonly as parting sheets, are connected at their respective edges by end bars and fins to enhance the heat transfer between the plates. Header tanks connected to the plates introduce the process and/or working fluids into the passages formed between the plates to accomplish the indirect heat exchange between the fluids.

Where one of the fluids is a liquid to be boiled at a boiling side surface of the heat exchanger, a porous coating can be used along the boiling side surface to promote heat transfer through a given surface, per unit surface area, (i.e., heat flux) in response to a given temperature difference at which boiling of the fluid will occur. For example, U.S. Pat. No. 4,917,960, discloses a coating that is formed from an aqueous solution containing a binder, such as a mixture of chromates and phosphates; and a fugitive or transient pore forming material such as a polyester; and aluminum particles. The coating can be applied as a slurry onto the surface of a heat exchange surface. Removal of the fugitive layer by heat or chemical solvent forms the resultant porous layer. The resulting porous coating can have a porosity ranging between 20 percent and 90 percent. The pore size can range between 20 microns and 60 microns. The aluminum particles of the slurry can have an average diameter of less than 4 microns.

Heat transfer efficiency is generally used to assess the performance of the porous coatings. As used herein and throughout the specification, the performance is defined by a temperature difference, $\Delta T$, that is equal to $T1-T2$, where $T1$ is defined as the temperature of the working fluid and $T2$ is defined as the temperature of the process fluid to be heated to its predetermined temperature (e.g., boiling point). A coating with a relatively lower $\Delta T$ would be considered better performing, by virtue of its ability to promote greater heat transfer to the process fluid for a given input of heat source (e.g., a gas located on the shell side of a shell and tube heat exchanger design having a temperature greater than that of the process fluid flowing within the tube of the shell and tube heat exchanger). Improved performance of a coating is defined at least in part by a reduction in the $\Delta T$. As will be explained in greater detail below, heat transfer efficiency will be used to assess coating performance of porous coatings for various applications, including boiling heat transfer applications, whereby heat is transferred from a heat source to a fluid to cause it to boil.

Generally speaking, the coatings disclosed in U.S. Pat. No. 4,917,960 are representative of conventional coatings that suffer from an unacceptably high $\Delta T$. In other words, a large amount of heat energy is required to be transferred to the boiling surface to boil the process fluid, which translates into inefficient processes having excessive power consumption.

Current available methods for applying powder and/or slurry compositions along the inner surface of heat exchanger conduits (e.g., tubes) can produce significant variation in the resultant porous coating thickness, which results in unacceptable performance variation. For example, current methods tend to produce coating defects along the inner surface of heat exchanger tubes such as "blow holes" in FIG. 6a and "slumping" in FIG. 6e and many others (e.g., poor bonding in FIG. 6b, bare spots in FIG. 6c, delamination in FIG. 6f and flaking in FIG. 6d) as also shown in FIGS. 6a-6f, any of which ultimately can reduce and/or degrade performance of the porous coated boiling surface.

Today's methods for applying powder and/or slurry compositions cannot reliably produce consistent porous coatings. For example, conventional spray methods cannot produce porous coatings with uniform thickness along heat exchanger surfaces. The problem is even more challenging when the porous coating is applied along the surface of an inner diameter of a conduit or tubular structure, which tends to be difficult to coat. As the inner diameter of heat exchanger conduits become smaller with emerging applications, coating consistency and thickness uniformity therealong becomes increasingly difficult to achieve with current available methods, and in many instances, may not be possible. The end result is heat transfer applications which are inefficient, and require increased power consumption to operate. In view of these shortcomings, there remains an unmet need for improved methods for applying slurries and/or powder compositions to produce consistent porous coating compositions in a controlled and reproducible manner.

SUMMARY OF THE INVENTION

In a first aspect of the present invention, a method for applying a coating onto a surface of an inner diameter of a conduit, comprising feeding a slurry formulation into a slurry reservoir, said slurry reservoir operably connected to an injection nozzle; introducing the injection nozzle in a forward direction into the conduit, said conduit defined, at least in part, by a longitudinal length extending between a first end and a second end; configuring the injection nozzle to a first position within the conduit, said first position defined as a first end of the injection nozzle being substantially aligned with the first end of the conduit; pumping said slurry from said slurry reservoir and through said injection nozzle so as to discharge slurry from the first end of the injection nozzle towards the inner surface of the conduit; detecting the discharge slurry; and rotating said conduit, thereby allowing the discharged slurry be spread and distributed substantially uniformly along the inner surface of the conduit; and retracting at a predetermined feed rate of said injection nozzle, said retracting occurring in a reverse direction opposite to said forward direction.

In a second aspect of the present invention, a method for applying a coating onto a surface of an inner diameter of a conduit, comprising: feeding a slurry formulation into a slurry reservoir; introducing the injection nozzle in a forward direction into the conduit; configuring the injection nozzle to a first position within the conduit; pumping said slurry from said slurry reservoir and through said injection nozzle so as to discharge slurry towards the inner surface of the conduit; rotating said conduit, thereby allowing the discharged slurry to be spread and distributed substantially uniformly along the inner surface of the conduit; and retracting at a predetermined feed rate of said injection nozzle while rotating said conduit, said retracting occurring in a reverse direction opposite to said forward direction.

The invention may include any of the aspects in various combinations and embodiments to be disclosed herein.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 2b shows an enlarged view of the slurry injection nozzle;

FIG. 2c shows an enlarged view of the slurry pump;

FIG. 2d shows an enlarged review of the slurry reservoir and injection nozzle with motor;

FIG. 2e shows the slurry injection nozzle extending into the tube to be coated;

FIG. 2f shows a slurry detection sensor and roller driver;

FIG. 2g shows the convective heaters configured to dry the coating that is applied by the nozzle;

FIG. 3a shows the injection nozzle in its starting position prior to starting the coating process;

FIG. 3b shows movement of the injection nozzle from the position of FIG. 3a farther advanced along the tube to be coated;

FIG. 3c shows the end or tip of the nozzle located at the end or edge of the tube, thereby placing the nozzle in an orientation that is ready to begin the coating process;

FIG. 3d shows backwards movement of the injection nozzle from out of the tube as the nozzle applies coating onto the tube, with the tube rotating;

FIGS. 6a, 6b, 6c, 6d, 6e and 6f illustrate[s] typical coating defects in conventional porous coatings, including blow holes (FIG. 6a); poor bonding (FIG. 6b); bare spots (FIG. 6c); flakes (FIG. 6d); slumping (FIG. 6e); and delamination (FIG. 6f);

FIG. 7 shows the pool boiling rig set-up utilized for evaluating coating performance;

FIG. 9a shows the injection nozzle in its starting position prior to starting the coating process with tube rotation;

FIG. 9b shows the injection nozzle from the position of FIG. 9a farther advanced along the tube to be coated with tube rotation;

FIG. 9c shows the end or tip of the nozzle located at the end or edge of the tube, thereby placing the nozzle in an orientation that is ready to begin the coating process with tube rotation;

FIG. 9d shows backwards movement of the injection nozzle from out of the tube to be coated with tube rotation;

FIG. 9e illustrates a simplified view of the coating apparatus of FIG. 2a, whereby air and convective heat are used to evaporate the solvent from the coating contained along the surface of the inner diameter;

FIG. 10a shows a first coating table for mass production that can have the structure and components shown in FIGS. 2a-2g to apply a slurry as described by the methods of the present invention, such as, by way of example, the methods in FIGS. 3a-3d or FIGS. 9a-9d; and FIG. 10b shows a second coating table dedicated for drying the coating;

FIGS. 11a, 11b and 11c show an alternative mass manufacturing process in accordance with the principles of the present invention in which FIG. 11a shows a first rolling table having a first batch of tubes located therealong which are shown to be coated by a pump that is configured to move between the rolling tables of FIGS. 11a, 11b and 11c;

FIG. 11b shows the pump having advanced from the rolling table of FIG. 11a to another rolling table of FIG. 11b where a second batch of tubes located therealong are shown being coated;

FIG. 11c shows a third rolling table having a third batch of uncoated tubes therealong to be coated upon completion of the second batch of tubes; and FIG. 12 shows a test heater assembly for flat square and circular samples.

DETAILED DESCRIPTION OF THE INVENTION

The advantages of the invention will be better understood from the following detailed description of the embodiments thereof in connection. The disclosure is set out herein in various embodiments and with reference to various aspects and features of the invention. It will be understood that the particular coating methods embodying the present invention are shown by way of illustration and not as a limitation of the present invention. The principles and features of this invention may be employed in various and numerous embodiments in various permutations and combinations without departing from the scope of the invention. The disclosure may further be specified as comprising, consisting or consisting essentially of, any of such combinations and permutations of these specific features, aspects, and embodiments, or a selected one or ones thereof.

All percentages are expressed herein as weight percentages except for porosity, which is expressed as volume-based. "Pre-mixed slurry" as used herein and throughout the specification means that the metallic, ceramic or other types of powders are mixed with a binder and a carrier or solvent to create a slurry formulation with a predetermined viscosity suitable for the substrate it is coated therealong. "Substrate" as used herein and throughout the specification means any surface to which a coating can be applied, including by way of example, a heat transfer surface, such as the surface of an inner diameter and/or outer diameter of a conduit of a heat exchanger tube. "Conduit" refers to any type of tubular-like structure of any shape, including, by way of example, a tube, pipe, channel, duct or trough.

The method of the present invention can be employed to apply any coating along the surface of an inner diameter of a substrate. In one embodiment, the substrate is a conduit. The coating method is characterized as a rolling method that can be utilized to apply any suitable coating onto an inner surface of a conduit. In a preferred embodiment and as will be described, the conduit is a condenser tube or heat exchanger tube and the coating is a porous coating that is applied onto the surface of an inner diameter of the tube by a rolling apparatus.

Figure 1:
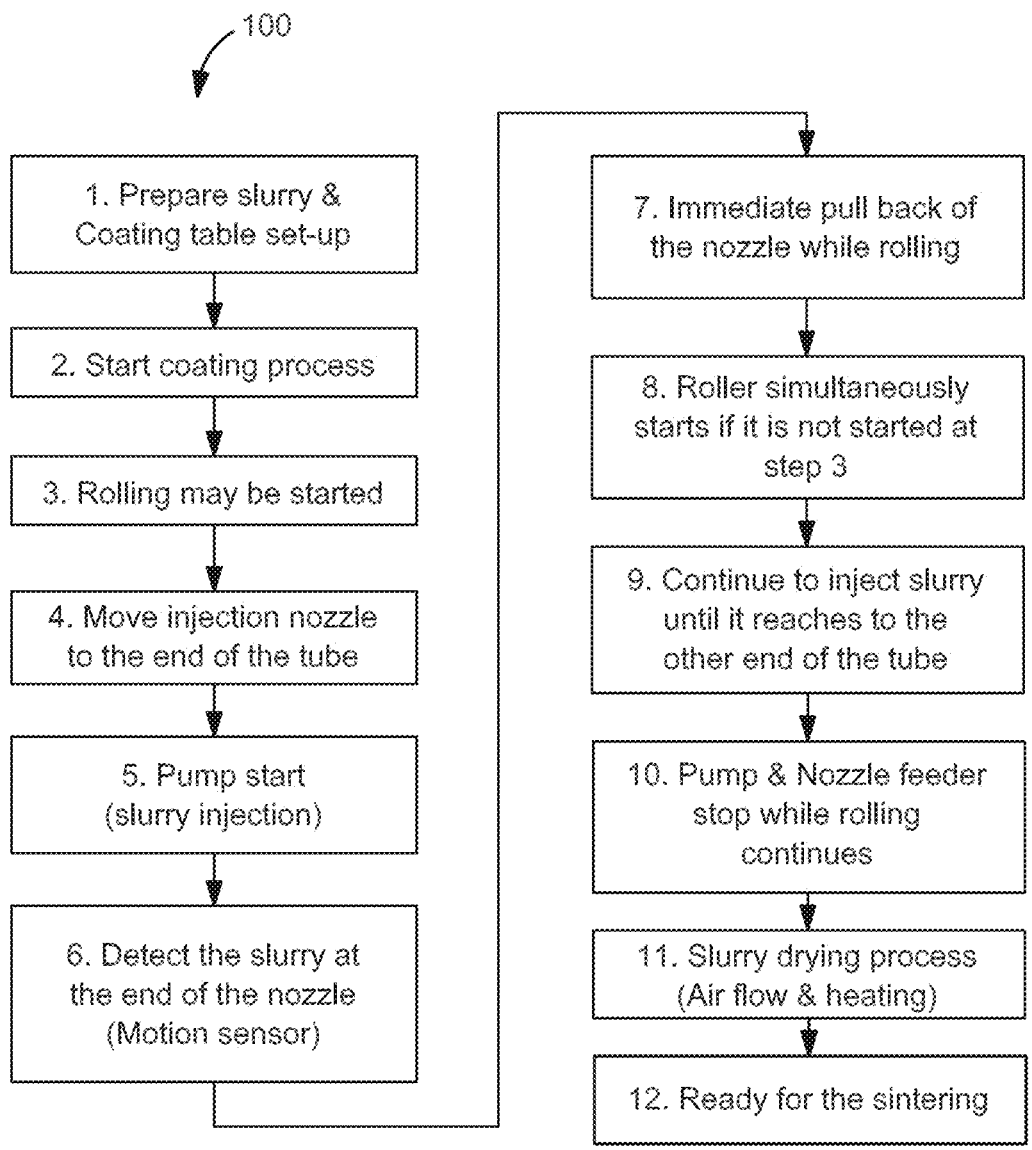
FIG. 1 illustrates a block flow diagram for applying a porous coating in accordance with the methods of the present invention.
Figure 2D:
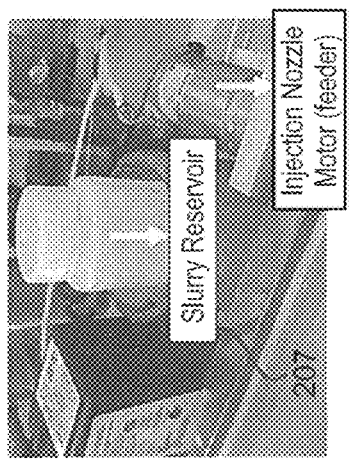
FIGS. 2b-2g illustrate enlarged sections of the coating apparatus of FIG. 2a and in particular.
Figure 2C:
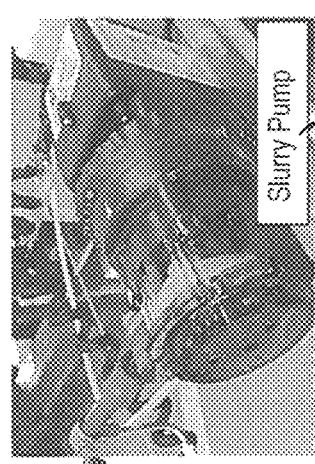
Figure 2E:
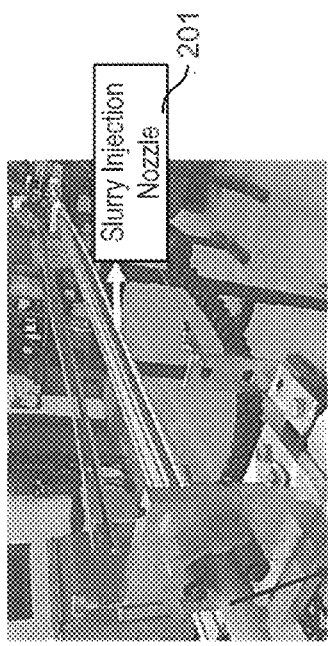
Figure 2A:
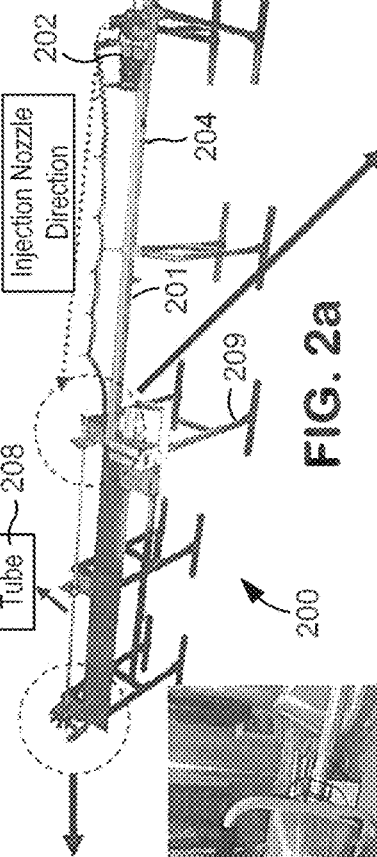
FIG. 2a illustrates an exemplary coating apparatus in perspective view embodying the principles of the present invention.
Figure 2B:
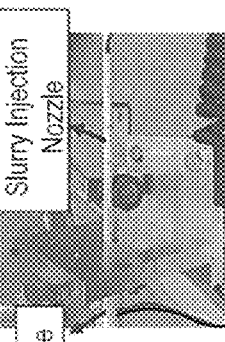
Figure 2:
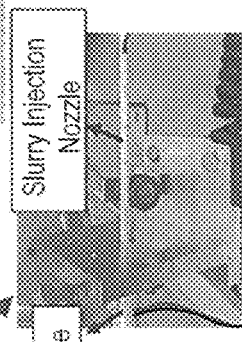
Figure 2F:
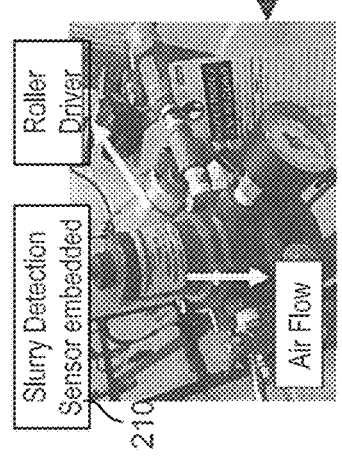
Figure 2G:
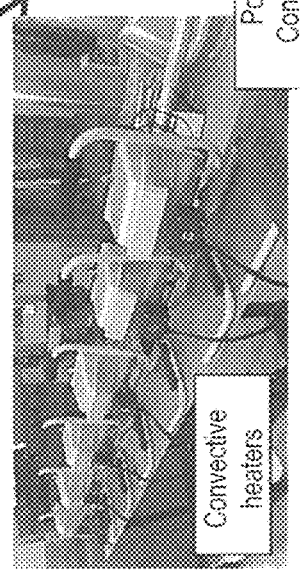

FIG. 1 shows one aspect of a coating method 100 in accordance with the principles of the present invention. An exemplary rolling apparatus is shown in FIG. 2. The rolling apparatus 200 is shown in its entirety in FIG. 2a, and includes an injection nozzle 201; peristaltic pump 202; feeder motor 203; rollers 204; heating elements 205; air flow device 206; and slurry reservoir 207. FIGS. 2b-2g show enlarged views of each of these components of the apparatus 200. The sequence of steps to perform the coating method 100 will now be described with respect to the block flow diagram of FIG. 1; FIGS. 2a-2g; and FIGS. 3a-3e. It should be noted that FIGS. 3a-3e intentionally omit structural details of the coating apparatus 200 shown in FIGS. 2a-2g for purposes of more clearly describing the methodology by which the coating steps are performed in accordance with the principles of the present invention.

Figure 3:
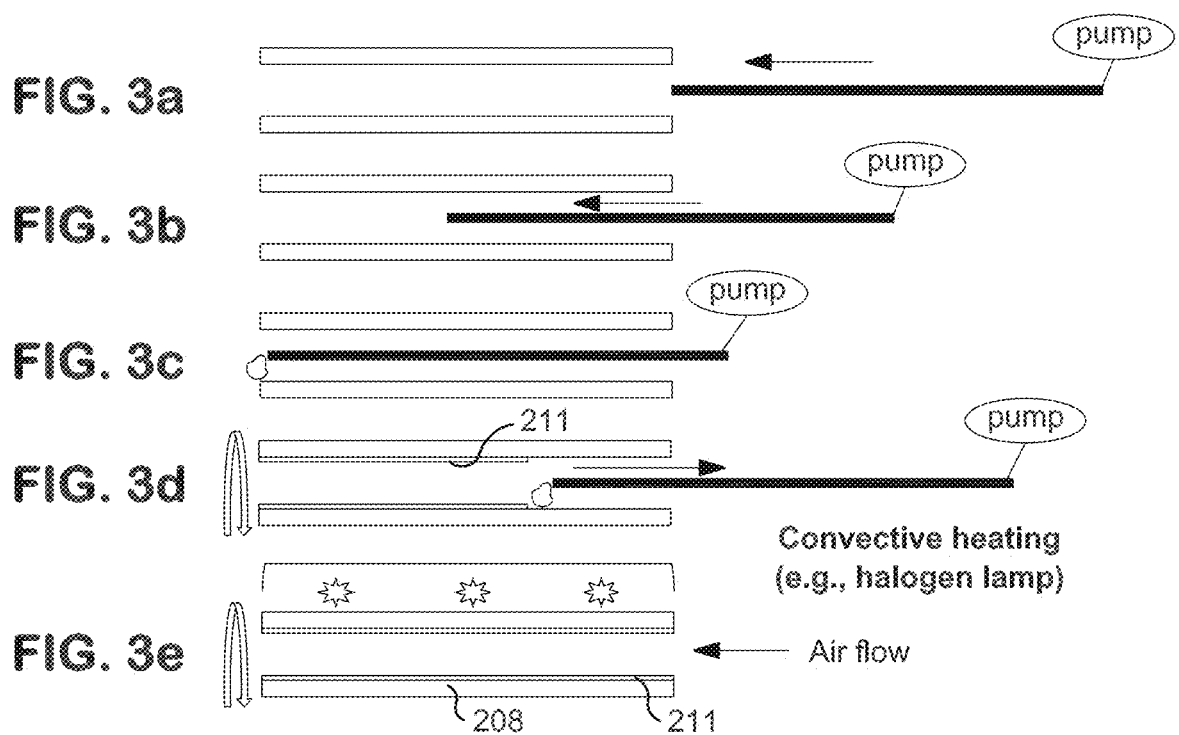
FIGS. 3a-3d illustrate a simplified side view of the coating apparatus of FIG. 2a, intended to display forward movement of the injection nozzle into the tube to be coated, and backwards movement of the injection nozzle from out of the tube to be coated, whereby the injection nozzle is substantially coaxially aligned with the tube during its movement, and in particular.
FIG. 3e illustrates a simplified view of the coating apparatus of FIG. 2a, whereby air and convective heat are used to evaporate the solvent from the coating contained along the surface of the inner diameter.

Generally speaking, the various components are assembled together and placed onto a supporting structure 209 to create the apparatus 200 as shown in FIG. 2. The constituents of the pre-mixed slurry are loaded into the slurry reservoir 207. FIG. 3a shows the injection nozzle 201 in its starting position prior to starting the coating process 100. The injection nozzle 201 is positioned outside of the tube 208. Preferably, the injection nozzle 201 has substantially the same longitudinal length as the tube 208 to be coated. The injection nozzle 201 is movable in a forward direction (as indicated by the arrows of FIG. 2a) and a reverse direction opposite to the forward direction. The injection nozzle 201 has an outer diameter that is smaller than the inner diameter of the tube 208 to allow the injection nozzle 201 to be moved therein. The advancement of the injection nozzle into the tube 208 can begin. The feeder speed of the feeder motor 203 is set to a predetermined level to allow controlled movement of the injection nozzle 201 from the position of FIG. 3a to that of FIG. 3b and ultimately the orientation FIG. 3c. The injection nozzle 201 preferably is introduced into the tube 208 such that it is preferably coaxially aligned with the tube 208; and such that equal lateral spacing exists between the nozzle 201 and the surfaces of the tube 208 to be coated. When the injection nozzle 201 has advanced to the position shown in FIG. 3c where the end or tip of the nozzle 201 is located at the end or edge of the tube 208, coating can begin. In particular, the pump 202 is activated to a predetermined pumping rate (volume/min) to pump slurry from the slurry reservoir 207. A motion sensor 210 (FIG. 20 embedded at the end of the roller (located by the air flow meter) detects when slurry begins to flow from the tip of the injection nozzle 203. In response to detection of the slurry exiting the nozzle discharge (FIG. 3c), the rollers 204 are activated at a predetermined rpm to begin rotation of the tube 208. The rotation of the tube 208 allows the slurry that is discharged from the tip of the injection nozzle 201 to be spread and distributed substantially uniformly along the surface of the inner diameter of the tube 208. With rotation of the tube 208, the injection nozzle 203 is retracted in the reverse direction at a controlled feed rate (inches/sec) to ensure that the coating is substantially uniformly applied onto the tube 208 along its entire longitudinal length. The slurry continues to be pumped from slurry reservoir 207 through nozzle 203, with continued rotation of the tube 208 as shown in FIG. 3d. The discharge of slurry from the nozzle 203 onto the surface of the inner diameter of tube 208 continues until the injection nozzle 201 has been retracted to the end of the tube 208 that is opposite to the end of the tube initially coated when the pumping of slurry began at FIG. 3c. When the entire surface of the inner diameter of the tube 208 has been coated (FIG. 3e) with coating 211, the pump and the feeder are deactivated. The coating 211 is dried by introducing air flow through the tube 208 and activating external convective heating with convective heating elements 205 (FIG. 2g) configured about the exterior of the tube 208 along its outer diameter to evaporate the solvent in the coating 211, thereby beginning the process of solidifying and sintering the coating. The heating and airflow can occur simultaneously or in a step-wise fashion. In one embodiment, the air flow is turned on, and subsequently convective heating ensues. To ensure evaporation of the solvent or carrier in the resultant coating 211, the heating may occur for a total duration ranging from about 10 to about 60 minutes, and more preferably about 30 to about 60 minutes; and air flow may occur at a flow rate from about 10 to about 50 standard cubic foot per hour (SCFH), and more preferably from about 10 to about 20 SCFH.

Upon evaporating the solvent, the coated tube 208 can be sintered. Suitable sintering conditions of the coated tube 208 as recognized in the art can be employed to attain the finalized coating morphology. By way of example, a two-step sintering method can be employed in an oven whereby the coated tube 28 is heated to a first intermediate temperature for a prescribed time, followed by a final heating step conducted at a higher temperature for a prescribed time, as a means to attain the finalized state of the resultant coating 208. One representative example of such a two-step sintering method includes heating at about 450° C. for about 1 hour in air, followed by heating in nitrogen at about 580 to about 620° C. for about 1 hour.

In this manner, as described with regards to FIG. 1, FIG. 2a-2g, and FIGS. 3a-3e, the inventive method 100 allows for improved uniformity, homogeneity and distribution of coating 211 along the surface of the inner diameter of the tube 208 in comparison to conventional coating methods such as spray processes, spraying and dipping.

Figure 9:
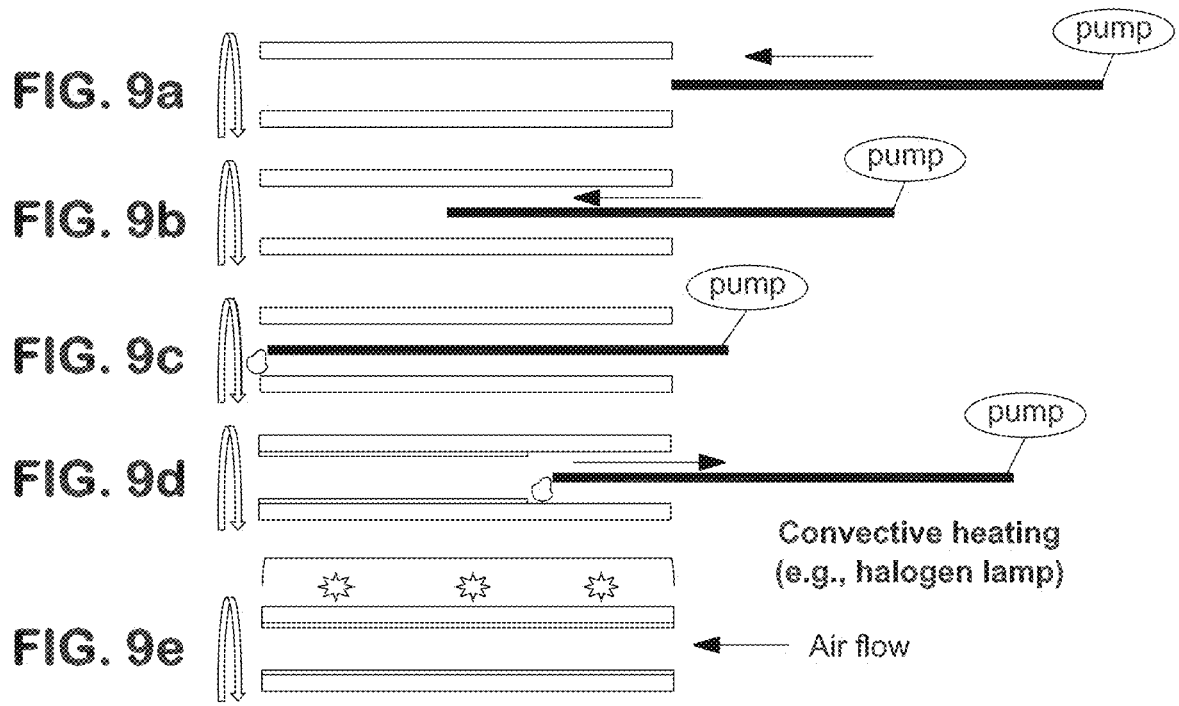
FIGS. 9a-9e shows an alternative rolling method approach in accordance with the principles of the present invention, in which rotation of the tube begins prior to advancement of the injection nozzle into the tube, and in particular.

It should be understood that the sequence of steps shown in FIG. 1 is illustrated for purposes of generally showing the process 100 and not necessarily limited to the particular sequence shown in the block flow diagram. By way of example, the rotation of the tube 208 may begin prior to advancing injection nozzle 203 to the end of tube 208 as shown in FIG. 3c. In this regard, FIGS. 9a-9e show an alternative embodiment where rotation of the tube 208 begins prior to introduction of the nozzle 203 into the tube 208. In particular, FIG. 9a shows the injection nozzle in its starting position prior to starting the coating process with tube rotation; FIG. 9b shows the injection nozzle from the position of FIG. 9a farther advanced along the tube to be coated with tube rotation; FIG. 9c shows the end or tip of the nozzle located at the end or edge of the tube, thereby placing the nozzle in an orientation that is ready to begin the coating process with tube rotation; FIG. 9d shows backwards movement of the injection nozzle from out of the tube to be coated with tube rotation; and FIG. 9e illustrates a simplified view of the coating apparatus of FIG. 2a, whereby air and convective heat are used to evaporate the solvent from the coating contained along the surface of the inner diameter.

Such rearrangement of steps is contemplated by the present invention without departing in scope from the present invention.

It should be understood that the rolling apparatus 200 is one example by which the inventive coating method can be carried out. Other apparatuses and modifications thereto may be contemplated for carrying out the present invention. By way of example, the peristaltic pump 202 may be substituted with another conventional pump that is suitable for pressurizing and pumping slurries of varying viscosities. Additionally, other suitable heating elements can be employed to evaporate the solvent or carrier in the coating 211.

Applicants have identified several coating parameters for performing the rolling coating method 100, including, coating time; feeder speed; and slurry pumping rate. In one embodiment the method 100 is performed at a feeder speed ranging from about 0.6 to about 0.9 inches/sec of nozzle movement during coating (i.e., nozzle retraction): a slurry pumping rate ranging from about 47 to about 67 ml/min; and a resultant weight gain of 56-88 g and a corresponding coating thickness ranging from about 12 to about 16 mils. The tube 28 may be rotated at a selected rpm that is selected to reduce or prevent particle segregation and prevent any signification changes of the porous structure and morphology as result of rpm values that create too low or too high of a centrifugal force, thereby maintaining the structural integrity of the coating and adhesion of the coating to the substrate surface. In this regard, the inventors have discovered that the tube 28 can rotate in a range from about 100 to about 1000 rpm, preferably from about 200 to about 400 rpm and more preferably from about 250 to about 350 rpm.

The exact combination of the coating parameters is dependent upon, at least in part, the slurry composition and its properties, including viscosity, and required production throughout (i.e., number of tubes 208 required to be coated per given unit time).

Various slurries can be applied using the rolling methods of the present invention. In a preferred embodiment, the method of the present invention utilizes the slurry material having a composition as described in co-pending U.S. patent application Ser. No. 14/884,087, the disclosure of which is hereby incorporated by reference herein its entirety, to produce a porous coating described therein. In one embodiment, the rolling method in accordance with the present invention is employed to produce a coating onto the surface of an inner diameter of a condenser tube have a coating specification defined by a mean average diameter particle size of about 40 µm; a coating thickness ranging from about 12 to about 16 mils; a median pore diameter of about 8 to about 12 µm; and an overall porosity based on about 40 to about 60% of the coating by total volume of the coating.

Applicants have discovered that employing the rolling method 100 of the present invention with the slurries and coatings described therein can result in superior performance over conventional porous coatings. However, it should be understood that other coatings can also be employed with the present invention with beneficial results of improved coating consistency with regards to superior morphology and reduced thickness gradients along the coated conduit; and reproducibility of the coated conduit from coating to coating.

Figure 4:
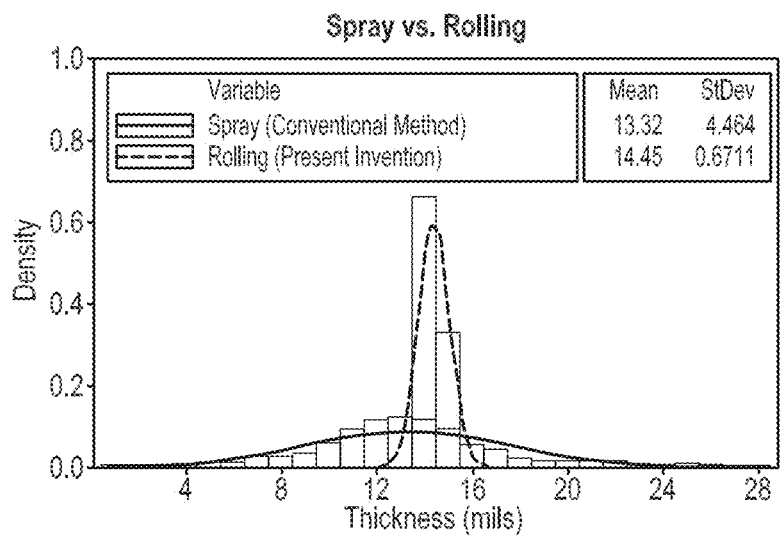
FIG. 4 show the thickness variation of porous coatings applied by the inventive method in comparison to conventional porous coatings applied by a conventional spray method.

FIG. 4 shows that the rolling method of the present invention results in less coating thickness variation relative to a conventional spray method along a surface of an inner diameter of a tube. The results indicated that thickness variation for coatings produced by the present invention had substantially less deviation from each other than those coatings produced by a conventional spray method. In this regard, the standard deviation for the present invention was determined to be 0.67 mils whereas the standard deviation for the spray method was determined to be 4.46 mils. This represents approximately an 85% reduction in variation.

Figure 5:
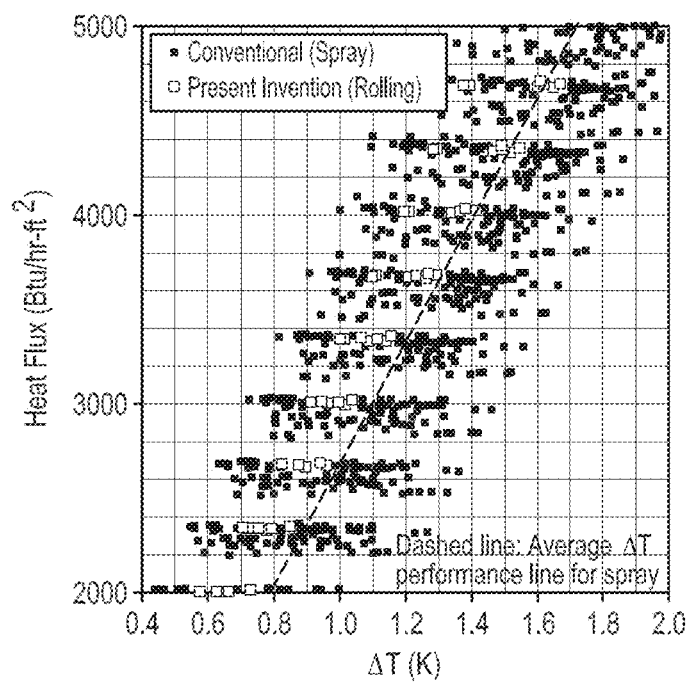
FIG. 5 shows a comparison in performance data between the rolling method of the present invention and a conventional spray method at various heat flux inputs.

The ability to consistently produce the coating thickness with minimal variation by the present invention has been discovered by the inventors to create less variation in performance. In this regard, FIG. 5 shows that the rectangular shaped dots are representative of the present invention, and the smaller rectangular-shaped dots are representative of a conventional spray method. The line designated "Average $\Delta T$ Performance for Spray" represents the average $\Delta T$ of the conventional spray method for each heat flux input. The present invention produces significantly less variation in $\Delta T$ than conventional spray methods for each of the heat influx inputs ranging from about 2000 to about 5000 Btu/hr-ft$^2$. The reduction in $\Delta T$ along the surface of an inner diameter of a tube translates into the ability to ensure consistent coating performance. The results indicate that the present invention exhibits significantly reduced performance variation within a coated substrate (i.e., reduced variation in $\Delta T$ along the entire longitudinal length of the tube) at each of the heat fluxes. The beneficial results are exhibited when applying any porous coating along the surface of an inner diameter of a single tube, with minimal thickness variation exhibited along the top, middle sections and bottom of a tube employing the methods of the present invention. The tighter control in performance (as indicated by the lower $\Delta T$ for a given heat flux input source) of the present invention can be attributed to greater control in thickness along the inner surface of the longitudinal length of the tube.

Preferably, relative to FIG. 5, the coating parameters of the present invention can be optimized to further decrease the coating thickness to those values described in Applicant's co-pending application Ser. No. 14/884,087, so as to further lower $\Delta T$ and therefore maximize heat transfer efficiency, and do so with greater reproducibility (less variation within a coated substrate) and consistency (less variation from coating to coating) than conventional coating methods, including the spray methods utilized for applying the conventional coating. The greater control in coating reproducibility and consistency from tube-to-tube and within a tube offered by the present invention results in less coating defects (e.g., blow holes and slumping).

Figure 10A:
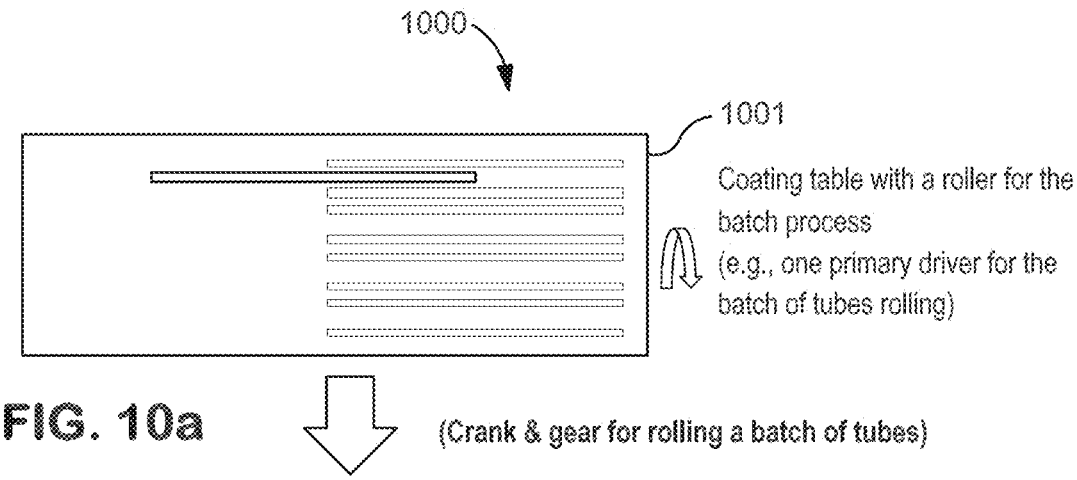
FIGS. 10a and 10b show an exemplary mass manufacturing process in accordance with the principles of the present invention, and in particular.
Figure 10B:
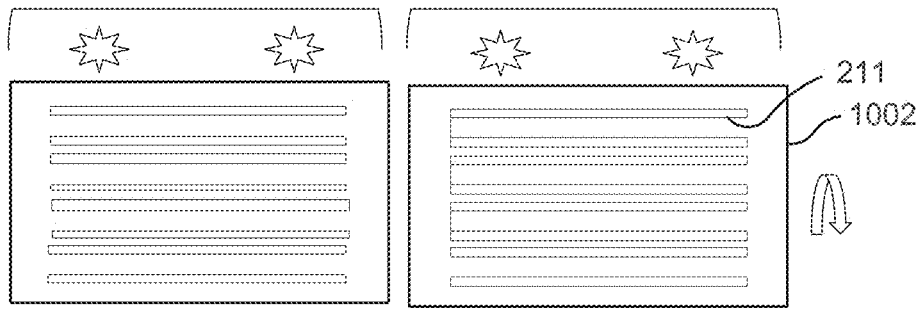

In another embodiment and as shown in FIGS. 10a and 10b, the principles of the present invention can be incorporated into a mass production process 1000 to coat multiple tubes 208 along their respective inner diameters. Referring to FIG. 10a, coating table 1001 can have the structure and components shown in FIGS. 2a-2g to apply a slurry as described by the methods of the present invention, such as, by way of example, the methods in FIGS. 3a-3d or FIGS. 9a-9d. For purposes of clarity, the sequence of steps as shown in the method 100 of FIG. 1 have been intentionally omitted to illustrate the manner in which the present invention can be employed to coat produce multiple tubes 208. In this regard, to coat a batch of tubes 208 at a high production volume, multiple rollers 204 can be employed and a single driver (e.g., crank and gear) mechanism may be used to rotate all the rollers 204 to enable simultaneous rotation of all tubes 208 coated on the coating table 1001. Other modifications may be contemplated for coating of multiple tubes 208 as shown in FIG. 10a.

After the coating the multiple tubes 208 in FIG. 10a, the tubes 208 are transferred to a second rolling table 1002. The coating 208 along each of the tubes 208 is not completely dry. Rather, the second rolling table 1002 can be exclusively utilized to dry the applied coating 211 so as to evaporate the solvent as performed in FIGS. 3e and 9e. In this regard, rolling table 1002 is dedicated for injecting air into the coated tubes 208 and heating of the tubes 208, such as by convective heating as illustrated in FIG. 10b by the heating assembly shown external to the second rolling table 1002. Alternatively, the air flow through the tubes 208 and heating can occur in separate steps; along separate rolling tables; and/or separate sections of a single rolling table. During such drying, the second rolling table 1002 preferably continues to roll the tubes 208 to ensure coating uniformity and distribution along the length of the tubes 208. Rolling of all tubes 208 may occur in a similar manner as shown in FIG. 10a. After drying, the tubes 208 can be transported to a furnace where sintering can occur. In this manner, continuous production of coated tubes 208 may be achieved.

Figure 11A:
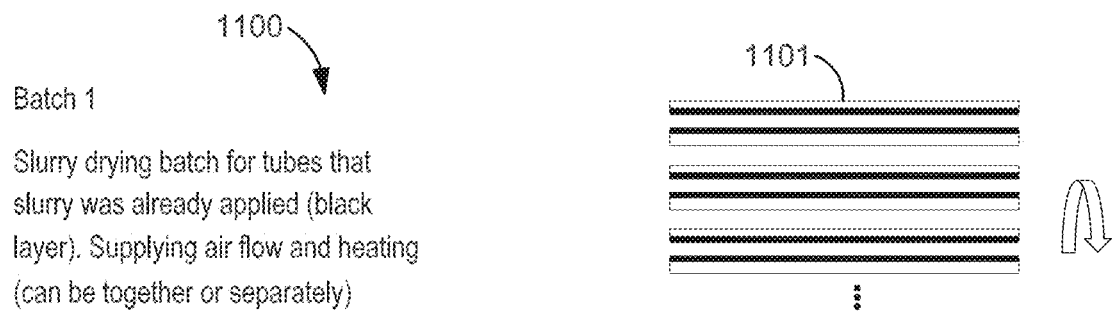
Figure 11B:
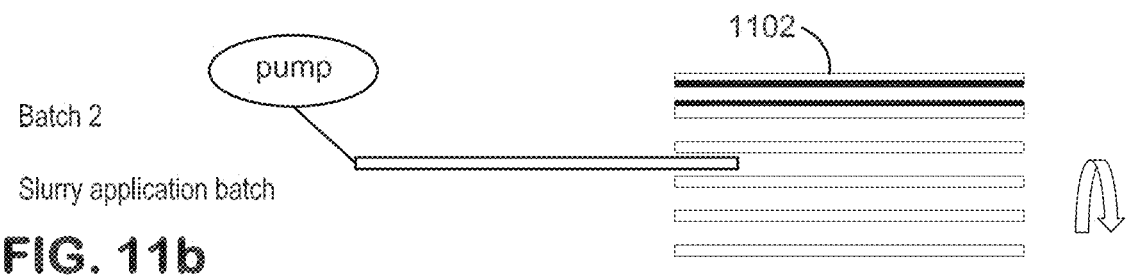
Figure 11C:
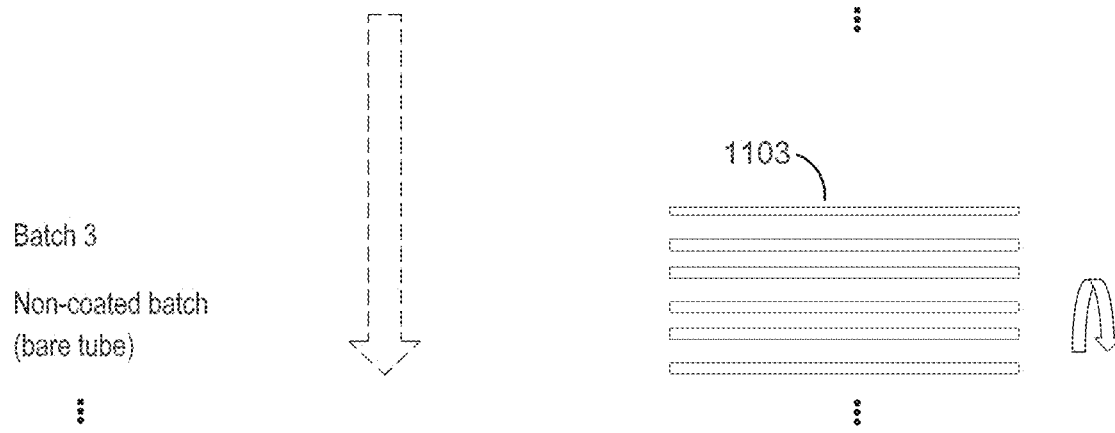

FIGS. 11a, 11b and 11c show[s] an alternative mass production 1100 embodiment for coating multiple tubes 208. For purposes of clarity, the sequence of steps as shown in the method 100 of FIG. 1 have been intentionally omitted to illustrate the manlier in which the present invention can be employed to mass produce coated tubes 208. Multiple rolling tables 1101 (FIG. 11a), 1102 (FIG. 11b) and 1103 (FIG. 11c) are shown. Each rolling table[s] 1101, 1102 and 1103 incorporates the structural elements and features of FIGS. 2a-2g. A pump is configured to move between the rolling tables 1101, 1102 and 1103 (as indicated by the downward arrow), thereby coating multiple tubes for mass production. The coating occurs as described in FIGS. 3a-3e. Any suitable pump may be utilized, including as shown in FIGS. 2a-2g. After the "batch 1" set of tubes, which are loaded on rolling table 1101 (FIG. 11a), is coated by the pump, the pump advances to rolling table 1102 (FIG. 11b) to coat the "batch 2" tubes therealong, and thereafter advances to the "batch 3" set of tubes (FIG. 11c) which are loaded on rolling table 1103. The rollers 204 for each rolling table 1101 (FIG. 11a), 1102 (FIG. 11b) and 1103 (FIG. 11c) may continue to rotate their respective tubes after coating and during the drying of the coating as indicated by the rotating arrows for each rolling table 1101, 1102 and 1103. Preferably, each of the batches 1, 2 and 3 can be rolling continuously by their respective rollers 204 during coating and drying of the coating. The number of roller tables can be varied (e.g., 10, 20 or greater) as needed to meet production throughput requirements. In this manner, an exemplary rolling method is provided in accordance with the principles of the present invention to enhance production throughput.

The benefits of the present invention are numerous. For example, in comparison to conventional coating methods, a greater amount of controllability of coating thickness uniformity across a longitudinal length of the coated substrate can be achieved when the coating is applied along the surface of an inner diameter of a single tube, with minimal thickness variation exhibited along the longitudinal length of the tube. Various sized tubes with inner diameters (e.g., 1 inch or less) and longitudinal length can be employed by the present invention to achieve such benefits. Further, greater consistency from coated substrate to coated substrate with regards to achieving the optimal coating properties disclosed in Applicants' co-pending application Ser. No. 14/884,087 is offered by the present invention relative to conventional methods. Still further, contrary to conventional coating methods, the present invention can coat small tube I.D.'s (e.g., 1 inch or smaller), and do so with a reduction of defects in comparison to conventional coating methods.

The present invention can produce improved porous coatings having increased consistency of target properties. Less heat energy is required to be transferred to the boiling surface to boil the process fluid, which translates into more efficient processes requiring less power consumption. In a preferred embodiment, the methods of the present invention are utilized to create porous coatings for improving heat transfer efficiency in boiling applications as part of an air separation unit. As an example, oxygen may be fed through a shell and tube heat exchanger and nitrogen gas may be flowing outside the tube along the shell side and serve as the heat input. The inventive methods are utilized to create a porous coating along the surface of the inner diameter of the tubes so as to enhance boiling heat transfer efficiency across the tube to the oxygen in the nucleate boiling regime. Less energy is required to boil the oxygen, as the temperature difference between the nitrogen and oxygen (i.e., $\Delta T$) is lower in comparison to porous coatings applied to the surface of the inner diameter of the tubes by conventional coating methods. The reduction in $\Delta T$ translates into less pressure of nitrogen required in the condenser which means less pressure in the lower column of the heat exchange system for the ASU. Less pressure in the lower column translates into less head pressure for the main air compressor system of the ASU.

Specifically, the power savings for an air separation unit (ASU) by the coating methods of the present invention can be substantial. By lowering the top $\Delta T$ of the main condenser for an ASU, the power efficiency in the ASU is improved. For example, a 0.3K reduction in Top $\Delta T$ of main condenser is equivalent to approximately a power savings of 0.5% in the total compression power (i.e., ~$7-$8 MM capitalized value).

Other coating applications besides boiling heat transfer applications for ASU's are contemplated. For example, various conventional epoxy coatings for anti-fouling/corrosion resistant applications can be applied onto a substrate utilizing the methods of the present invention.

The following tests described below were performed by the inventors to assess performance of the present invention with conventional methods. Coating performance was assessed by a pool boiling performance test; which is known in the industry to assess a coating's heat transfer efficiency. The methods for performing such pool boiling performance tests are well known and documented in the published literature, including A. Priarone, *Effect of surface orientation on nucleate boiling and critical heat flux of dielectric fluids*, International Journal of Thermal Sciences, 44, 2005, pp 822-831; and Jung et al., *Observations of the Critical Heat Flux Process During Pool Boiling of FC-72*, Journal of Heat Transfer, 135 (4), 041501, January 2014. A schematic of the two test specimens used for the pool boiling performance test is shown in FIG. 12 below. The test specimen consisted of a heater assembly. A schematic of the heater assemblies used for the pool boiling tests are shown in FIG. 12.

One of the heater assemblies consisted of a flat square aluminum block ("block"). The other heater assembly consisted of a cylindrical tube aluminum block ("tube"). The tubes were then mounted onto the circular shape base blocks (see FIG. 12). Both heater assemblies included a heating element, G10 substrate, Stycast® epoxy and wires.

Fabrication of both of the heater assemblies was as follows. Both the block and the tube were coated on one surface with the porous coating to be evaluated. The block was coated on the top surface. The tube was coated along its inner diameter. The other surface of the block and tube were plated with Nickel onto which a heating square-shaped resistor (10Ω) was attached by soldering. The block and resistor assembly were then placed on the G10 substrate with the coated side up for the block as shown in FIG. 12 below. Similarly, the tube and resistor assembly were placed on the G10 substrate as shown in FIG. 12 below. Stycast® cryogenic epoxy was then carefully distributed around the perimeter of the block assembly and the tube assembly to expose only the top (1"×1") surface. The epoxy and the substrate also functioned as insulators by preventing heat loss through the sides and bottom and ensuring that heat from the resistor was directed to the porous coating. Temperature measurements were obtained using T-type thermocouples that were embedded in the block and tube. Three T-type thermocouples were embedded and located below the heater surface with ⅛" interval from the surface as shown in FIG. 12. A RTD type thermocouple was also used to measure the bulk temperature for calibration of the temperature measurements.

As a test pool, stainless steel and glass dewars were used. The glass dewar was used to visualize the liquid nitrogen boiling as needed during the test. It needs to be noted that the performance results are only valid for relative comparison due to the fact that the boiling performance is dependent upon the heat flux which is dependent on test heater geometry (e.g., flat vs. circular).

Each of the fabricated heater assemblies were loaded inside a respective dewar. FIG. 7 shows a representative set-up of the block heater test assembly loaded inside the dewar.

Figure 8:
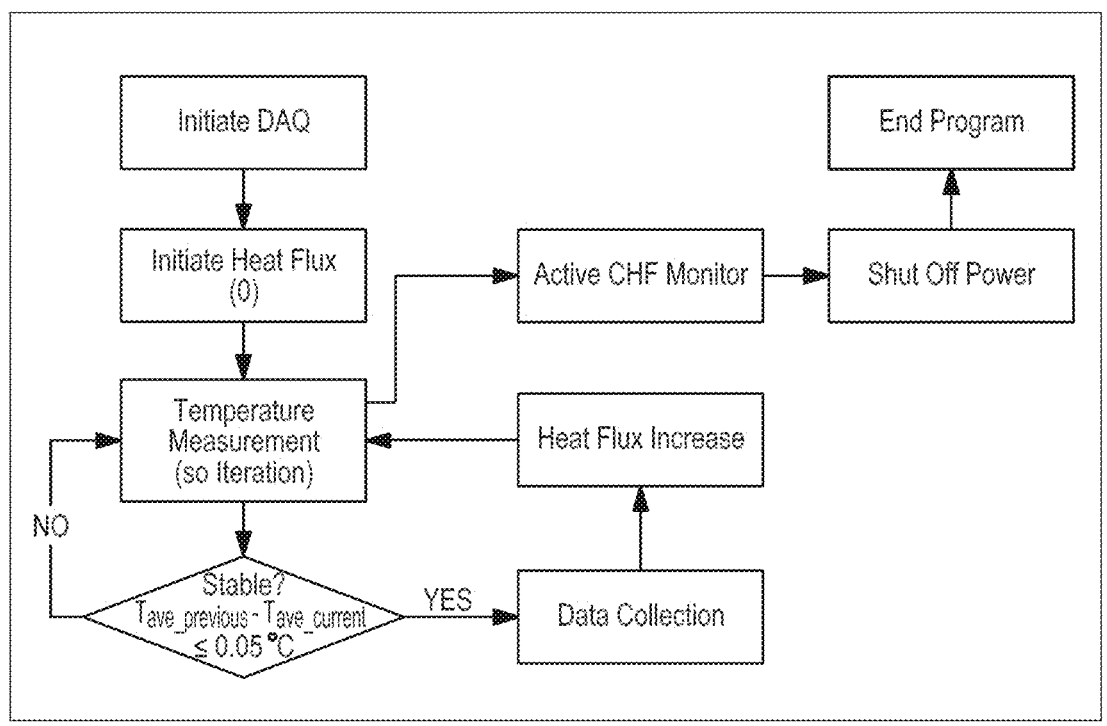
FIG. 8 shows the test flow diagram for the pool boiling performance test.

The dewar was then filled with liquid nitrogen to 70% of the dewar height (i.e., 12 inches). When the temperatures of both the test heater assembly and the bulk liquid nitrogen reached saturated conditions (i.e., steady state at −320F), the pool boiling experiments were initiated. The experiments were controlled and monitored using a program created in LabVIEW. The program controlled a National Instruments Compact DAQ data acquisition system (cDAQ-917) and an Agilent N5749A power supply (750W maximum power) to generate heat-flux-controlled boiling curves. This was achieved by incrementally raising the heat flux and then allowing for the test heater temperature to reach equilibrium before proceeding to the next heat flux increment. The process was repeated up to the so-called "critical heat flux" ("CHF"). The onset of the CHF was identified by a sudden and drastic rise in temperature at an elevated heat flux. Upon reaching the CHF, the program shut down power to the test heater and saved all the data to a file. All tests were conducted at 1 atmospheric pressure. A test flow diagram is shown in FIG. 8 by which the ΔT was evaluated. The Glass dewar was used to capture the boiling behavior (e.g., partial boiling) with a high speed camera.

The following examples are intended to provide a basis for comparison of the present invention, with conventional methods, but they are not construed as limiting the present invention.

Example 1

The rolling method of the present invention was utilized to create a porous coating as described in Applicants' co-pending application, designated as application Ser. No. 14/884,087. The rolling apparatus 200 as shown and described in FIGS. 2a-2g was assembled and thereafter operated to pump and inject a slurry onto a surface of an inner diameter of a tube 28 having a longitudinal length of 60 inches and an inner diameter of 0.7 inches. The slurry formulation was about 1.1 wt % Mg: 0.55 wt % Sn; 2% polyvinyl butyral (PVB); 43 wt % isopropyl alcohol (IPA) and 53.35 wt % aluminum based powder, commercially available as Ampal® 611 from Ampal, Inc. where percentages are based on overall coating weight. Each of these slurry constituents was pre-mixed and then fed into the slurry reservoir 207 located along the injection nozzle 201.

Having loaded the slurry into the slurry reservoir 207, the injection nozzle 203 was advanced into the tube 28 so as to co-axially orient the nozzle 23 fully within the tube 28 and align the tip of the nozzle 23 with the edge of the tube 28, as illustrated in FIG. 3c. In this configuration, the coating process was initiated. The coating was performed with the following coating parameters. The roller speed was to 300 rpm for rotation of the tube 28. The feeder speed of feeder motor 203 was maintained at 0.70-0.75 inches/second to control movement of injection nozzle 203 (i.e., the rate of retraction of the nozzle from within the tube during injection of the slurry). The pumping rate of the pump 202 was set at approximately 50 mL/min of slurry. The total slurry volume to be injected was 100-106 mL so as to create a coating thickness on the tube 28 inner diameter of 12-16 mils along its entire length.

Average coating thickness was approximately 15 mils. The variation in thickness of the coatings from sample to sample was measured to be less than about 1 mil. Thickness variation of the coating within a single tube was measured on average to be less than about 1 mil. The results are graphically illustrated at FIG. 4.

The test results also indicated that the coating produced by the rolling method of the present invention exhibited significantly reduced performance variation within a coated substrate for each of the heat flux inputs of 1000-5000 Btu/hr-ft$^2$. The resultant coated tubes were observed by Scanning Electron Microscopy and exhibited no coating defects.

Example 2

The performance of the porous coating produced in Example 1 was evaluated. A Liquid Nitrogen rig test was performed using the porous coating produced in Example 1 to determine the ΔT, and thereby assess the coating performance. Pool boiling tests were carried out as described.

The results are shown at FIG. 5. The test results in FIG. 5 indicated that for a given heat flux input source, less variation in ΔT was observed, as compared to the conventional spray methods of the conventional porous coating.

As can be seen, the improved methods of the present invention can control coating thickness with less variation relative to conventional methods. Less variation of the coating thickness results better consistency in performance relative to conventional methods.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method for applying a coating onto a surface of an inner diameter of a heat exchanger conduit, comprising:
   feeding a pre-mixed slurry formulation into a slurry reservoir, said slurry reservoir operably connected to an injection nozzle;
   introducing the injection nozzle in a forward direction into the heat exchanger conduit, said heat exchanger conduit defined, at least in part, by a longitudinal length extending between a first end and a second end;
   configuring the injection nozzle to a first position within the heat exchanger conduit, said first position defined as a first end of the injection nozzle being substantially aligned with the first end of the heat exchanger conduit;
   pumping said pre-mixed slurry formulation from said slurry reservoir and through said injection nozzle so as to discharge said pre-mixed slurry formulation from the first end of the injection nozzle towards the inner surface of the heat exchanger conduit;
   detecting the discharged pre-mixed slurry formulation and, in response thereto;
   rotating said heat exchanger conduit, thereby allowing the discharged pre-mixed slurry formulation to be spread and distributed substantially uniformly along the inner surface of the heat exchanger conduit; and
   retracting at a predetermined feed rate said injection nozzle, said retracting occurring in a reverse direction opposite to said forward direction.

2. The method of claim 1, further comprising:
   retracting the injection nozzle to a second position relative to the heat exchanger conduit, said second position defined as the first end of the injection nozzle being substantially aligned with the second end of the heat exchanger conduit.

3. The method of claim 2, further comprising:
   deactivating the step of pumping said pre-mixed slurry formulation;
   introducing air through the heat exchanger conduit;
   heating said heat exchanger conduit; and
   evaporating solvent from the coating applied onto the inner surface of the heat exchanger conduit.

4. The method of claim 3, wherein said air is introduced at about 10-50 standard cubic feet per hour (SCFH).

5. The method of claim 1, wherein said rotating occurs from about 100 to about 400 rpm.

6. The method of claim 1, wherein said first position is further defined as having a second end of the injection nozzle being substantially aligned with the second end of the heat exchanger conduit.

7. The method of claim 1, wherein said predetermined feed rate is about 0.6 to about 0.9 inches/sec of nozzle movement in the reverse direction.

8. The method of claim 1, further comprising pumping said pre-mixed slurry formulation at a rate of about 47-67 mL/min.

9. The method of claim 1, wherein said heat exchanger conduit is a tube having an inner diameter of about 1 inch or less.

10. The method of claim 1, wherein said predetermined feed rate is about 0.6 to about 0.9 inches/sec of nozzle movement in the reverse direction, said pre-mixed slurry formulation is pumped at a rate of about 47 to about 67 mL/min, and said predetermined feed rate is at about 0.6 to about 0.9 inches/sec of nozzle movement in the reverse direction.

11. The method of claim 1, wherein said steps of retracting and rotating occur simultaneously.

12. The method of claim 1, wherein said injection nozzle is substantially coaxially aligned with the heat exchanger conduit.

13. The method of claim 1, further comprising sintering the coating.

14. The method of claim 1, wherein said pre-mixed slurry formulation is discharged so as to create a coating thickness of from about 12 to about 16 mils.

15. A method for applying a coating onto a surface of an inner diameter of a heat exchanger conduit, comprising:
   feeding a pre-mixed slurry formulation into a slurry reservoir;
   introducing an injection nozzle in a forward direction into the heat exchanger conduit;
   configuring the injection nozzle to a first position within the heat exchanger conduit;
   pumping said pre-mixed slurry formulation from said slurry reservoir and through said injection nozzle so as to discharge said pre-mixed slurry formulation towards the inner surface of the heat exchanger conduit;
   detecting the discharged pre-mixed slurry formulation and, in response thereto;
   rotating said heat exchanger conduit, thereby allowing the discharged pre-mixed slurry formulation to be spread and distributed substantially uniformly along the inner surface of the heat exchanger conduit; and
   retracting at a predetermined feed rate said injection nozzle while rotating said heat exchanger conduit, said retracting occurring in a reverse direction opposite to said forward direction.

16. The method of claim 15, wherein said heat exchanger conduit and said nozzle have substantially the same longitudinal length.

17. The method of claim 15, wherein about 60 to about 84 g of coating is applied onto the surface of the inner diameter so as to attain a maximum thickness variation along the heat exchanger conduit of no greater than about 2.0 mils.

* * * * *